United States Patent
Mielenz et al.

(10) Patent No.: US 11,592,813 B2
(45) Date of Patent: Feb. 28, 2023

(54) METHOD AND CONTROLLER FOR THE SITUATIONAL TRANSMISSION OF SURROUNDINGS INFORMATION OF A VEHICLE

(71) Applicant: Robert Bosch GmbH, Stuttgart (DE)

(72) Inventors: Holger Mielenz, Ostfildern (DE); Jonas Binding, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 62 days.

(21) Appl. No.: 16/679,391

(22) Filed: Nov. 11, 2019

(65) Prior Publication Data

US 2020/0192353 A1    Jun. 18, 2020

(30) Foreign Application Priority Data

Dec. 17, 2018 (DE) ................ 10 2018 221 939.7

(51) Int. Cl.
*G05D 1/00* (2006.01)
*G06V 20/56* (2022.01)

(52) U.S. Cl.
CPC ......... *G05D 1/0038* (2013.01); *G05D 1/0022* (2013.01); *G06V 20/56* (2022.01)

(58) Field of Classification Search
CPC . G05D 1/0038; G05D 1/0022; G06K 9/00791
USPC ......................................................... 701/2
See application file for complete search history.

(56) References Cited

U.S. PATENT DOCUMENTS

| | | | | |
|---|---|---|---|---|
| 10,584,971 B1* | 3/2020 | Askeland | ............... | G01C 21/32 |
| 2013/0182066 A1* | 7/2013 | Ishimoto | ................. | E02F 9/261 |
| | | | | 348/38 |
| 2014/0067187 A1* | 3/2014 | Ferguson | .............. | B60W 30/16 |
| | | | | 701/28 |
| 2014/0088824 A1* | 3/2014 | Ishimoto | .................. | B60R 1/00 |
| | | | | 701/34.4 |
| 2015/0217691 A1* | 8/2015 | Tanuki | ...................... | B60R 1/00 |
| | | | | 348/148 |
| 2017/0251181 A1* | 8/2017 | Smolyanskiy | ......... | G05D 1/005 |
| 2018/0095459 A1* | 4/2018 | Bachrach | ............. | G05D 1/0038 |
| 2019/0220002 A1* | 7/2019 | Huang | ...................... | G06T 7/70 |
| 2019/0346841 A1* | 11/2019 | Litkouhi | .............. | G05D 1/0022 |
| 2020/0184823 A1* | 6/2020 | Eigel | .................... | G08G 1/0112 |
| 2020/0192351 A1* | 6/2020 | Rastoll | ................. | G05D 1/0027 |

FOREIGN PATENT DOCUMENTS

| | | |
|---|---|---|
| DE | 10 2017 200 842 A1 | 7/2018 |
| DE | 10 2017 209 195 A1 | 12/2018 |

\* cited by examiner

*Primary Examiner* — Jin Ge
(74) *Attorney, Agent, or Firm* — Maginot, Moore & Beck LLP

(57) ABSTRACT

The disclosure relates to a method for the situational transmission of surroundings data of a vehicle, comprising the steps: determining a driving situation of the vehicle; determining relevant surroundings data from recorded surroundings data based on the driving situation, wherein the relevant surroundings data are a subset of the recorded surroundings data that are relevant to the driving situation; and providing the relevant surroundings data to an external data processing device.

9 Claims, 3 Drawing Sheets

METHOD AND CONTROLLER FOR THE SITUATIONAL TRANSMISSION OF SURROUNDINGS INFORMATION OF A VEHICLE

This application claims priority under 35 U.S.C. § 119 to application no. DE 10 2018 221 939.7, filed on Dec. 17, 2018 in Germany, the disclosure of which is incorporated herein by reference in its entirety.

TECHNICAL FIELD

The present disclosure relates to a method for the situational transmission of surroundings information of a vehicle, to a controller, to a transmission system, to a computer program and to a computer-readable storage medium.

BACKGROUND

It needs to be taken into consideration for at least partly self-driven vehicles that there are sometimes situations in which a vehicle is not able to make an explicit decision with regard to further travel. In such cases, a remote operation service provider usually contributes to further clarifying this undecidable situation in order then to allow the vehicle to travel further in an at least partly automated manner. For this purpose, it may be necessary for a remote operator to have to monitor the further travel of the vehicle, including for a relatively long period of time.

A vehicle usually comprises a multiplicity of surroundings sensors, such as cameras, radar systems or lidar systems, in order to monitor said vehicle. The surroundings information recorded thereby is usually transmitted wirelessly to the remote operator, where the recorded surroundings information is displayed to the remote operator. Due to the multiplicity of surroundings sensors, the recorded surroundings information generally comprises a comparatively large amount of transmission data.

The desire for improved transmission of surroundings information may therefore arise.

SUMMARY

Embodiments of the disclosure provide an improved control device, a method, a transmission system and an at least partly self-driven vehicle. Expedient developments of the disclosure emerge from the description and the accompanying figures.

The proposed method for the situational transmission of surroundings data of a vehicle comprises the steps:
  determining a driving situation of the vehicle;
  determining relevant surroundings data from recorded surroundings data based on the driving situation, wherein the relevant surroundings data are a subset of the recorded surroundings data that are relevant to the driving situation;
  providing the relevant surroundings data to an external data processing device.

The term "driving situation" preferably comprises a current and/or upcoming traffic situation and/or a planned driving maneuver of the vehicle and/or a current position of the vehicle. A planned driving maneuver preferably comprises changing a traffic lane, turning off at a crossing, changing speed or the like, in particular based on a determined driving trajectory.

The recorded surroundings data preferably comprise all of the surroundings data that have been recorded by all of the surroundings sensors of the vehicle, whereas the relevant surroundings data constitute a subset thereof, for example all of the surroundings data that have been recorded by just some of the surroundings sensors, or just particular surroundings data from one or more surroundings sensors.

A driving trajectory is preferably determined based on the driving situation. The driving trajectory indicates the path that the vehicle is intended to take. The relevant surroundings data thus constitute those subsets of the recorded surroundings data that could have an influence on determining the driving trajectory.

The surroundings sensors preferably comprise cameras, radars, microphones and/or lidar sensors.

The vehicle, in particular the controller of the vehicle, in principle determines the relevant surroundings data based on the recorded surroundings data. By way of example, surroundings data from the rear side of the vehicle are not necessary for an obstacle occurring on the front side of the vehicle. The relevant surroundings data accordingly advantageously do not comprise surroundings data from surroundings sensors of the vehicle at the rear side of the vehicle. Only the relevant surroundings data are therefore transmitted to the external data processing device.

The external data processing device is preferably designed as a remote operation device (remote assistance), wherein the remote operation device is operated by a remote operator, and/or designed as a traffic control center (vehicle control center) and/or as a database system for storing the relevant surroundings information.

The relevant surroundings data are preferably determined continuously, but as an alternative the relevant surroundings data may also be determined or adjusted upon request, in particular upon request from the external data processing device.

The recorded surroundings data are preferably recorded by a recording device of the vehicle, in particular a camera, a radar, a microphone or a lidar system. As an alternative, surroundings data may however also originate from external sources, such as preferably a traffic light, which is able to give a better overview of a traffic situation and provide the surroundings data to the vehicle via the Internet of Things (IOT).

In one preferred embodiment, the relevant surroundings data are adjusted based on a change in the driving situation and/or the relevant surroundings data are adjusted based on a control signal from the external data processing device.

If a driving situation is determined for which particular surroundings data, in particular image data or measurement data, of particular surroundings sensors are not required, these irrelevant surroundings data are no longer provided to the external data processing device and therefore no longer transmitted.

The process here is however a dynamic process. If the driving situation should change, that is to say for example should a new traffic situation be present, or should the external data processing device, in particular a remote operator operating it, want further surroundings data, then the relevant surroundings data are adjusted. By way of example, the provision, and accordingly transmission, of surroundings data from previously irrelevant surroundings sensors is reactivated.

The adjustment of the relevant surroundings data based on the control signal preferably suppresses the adjustment of the relevant surroundings data based on the change in the driving situation.

The determination of the relevant surroundings data and/or the adjustment of the relevant surroundings data based on the change in the driving situation is preferably performed by the vehicle itself, preferably by a controller of the vehicle. The external data processing device, in particular the remote operator operating it, is preferably able to overwrite any decision of the vehicle with regard to the relevant surroundings data. The external data processing device thus retains complete control.

In one preferred embodiment, the relevant surroundings data are transmitted to the external data processing device, wherein a lower data rate is preferably required in order to transmit the relevant surroundings data than to transmit the recorded surroundings data.

The recorded surroundings data have a recorded file size, whereas the relevant surroundings data have a relevant file size, wherein the relevant file size is smaller than or the same as the recorded file size.

As a result, a lower data rate is required in order to transmit the relevant surroundings data than to transmit the recorded surroundings data. In this way, it is also possible to use relatively low-performance wireless transmission technologies and/or to reduce costs in the case of volume-based billing. Furthermore, fluctuations in the transmission network of the wireless transmission technologies have fewer effects on the monitoring of the vehicle. The wireless transmission technologies comprise Bluetooth, WLAN, mobile radio (LTE, 5G) or the like.

The method thus relates to reducing the required data rates for transmitting the surroundings information, in particular the image data, to the external data processing device, in particular to a remote operation service provider, such that, by way of a prediction about the upcoming traffic situation and/or the planned driving maneuver of the vehicle and/or about an evaluation of the events in the surroundings, only the relevant surroundings data, that is to say those required by the remote operation service provider, are transmitted, and surroundings data that are not required are not transmitted.

In one preferred embodiment, the vehicle is designed as an at least partly self-driven vehicle.

In one preferred embodiment, the relevant surroundings data and/or the recorded surroundings data comprise image data, in particular video data, microphone data, radar data and/or lidar data.

Depending on the kind of surroundings sensors that are used, the recorded surroundings data and thus also the relevant surroundings data comprise further types of surroundings data.

The external data processing device is preferably controlled by a remote operator. The remote operator preferably evaluates a planned driving maneuver of the vehicle based on the relevant surroundings data. Again preferably, the remote operator adjusts a planned driving maneuver of the vehicle or independently defines a new driving maneuver for the vehicle for the next travel section. The remote operator is preferably designed as artificial intelligence that is in particular executed on a processor.

The relevant surroundings data provided to the external data processing device are preferably transmitted to the external data processing device and displayed visually to the remote operator. The vehicle, in particular the controller, proposes relevant surroundings data according to the current driving situation. Should the remote operator require further surroundings data, or even require less surroundings data, then the remote operator may request this by way of the control signal, as a result of which the relevant surroundings data are adjusted and only the surroundings data required by the remote operator are provided, transmitted and displayed.

Should the driving situation change during the remote operation by the remote operator, then the vehicle is able to adjust the relevant surroundings data independently and provide and transmit additional surroundings data to the remote operator. The remote operator is able to view the additional surroundings data displayed thereto and decide whether said data should continue to be provided and transmitted thereto or to dispense with said data.

The proposed controller is configured so as to perform steps of the described method.

The controller preferably comprises a processor.

The proposed transmission system for the situational transmission of surroundings information of a vehicle comprises a recording device that is configured so as to record surroundings data and a described controller for the situational transmission of surroundings information of a vehicle. The transmission system comprises a transmission device that is configured so as to transmit the relevant surroundings data to the external data processing device.

The transmission device is preferably designed as a communication interface.

A computer program that prompts a processor, when it is executed thereby, to perform steps of a described method is proposed.

A computer-readable storage medium, on which a described computer program is stored, is proposed.

An at least partly self-driven vehicle, comprising a described controller that is configured so as to perform the described method, is preferably proposed.

Further measures that improve the disclosure are illustrated in more detail below together with the description of the preferred exemplary embodiments of the disclosure with reference to figures.

BRIEF DESCRIPTION OF THE DRAWINGS

Exemplary embodiments of the disclosure are presented in the drawings an are explained in more detail in the description below.

In the Figures.

DETAILED DESCRIPTION

Figure 1:
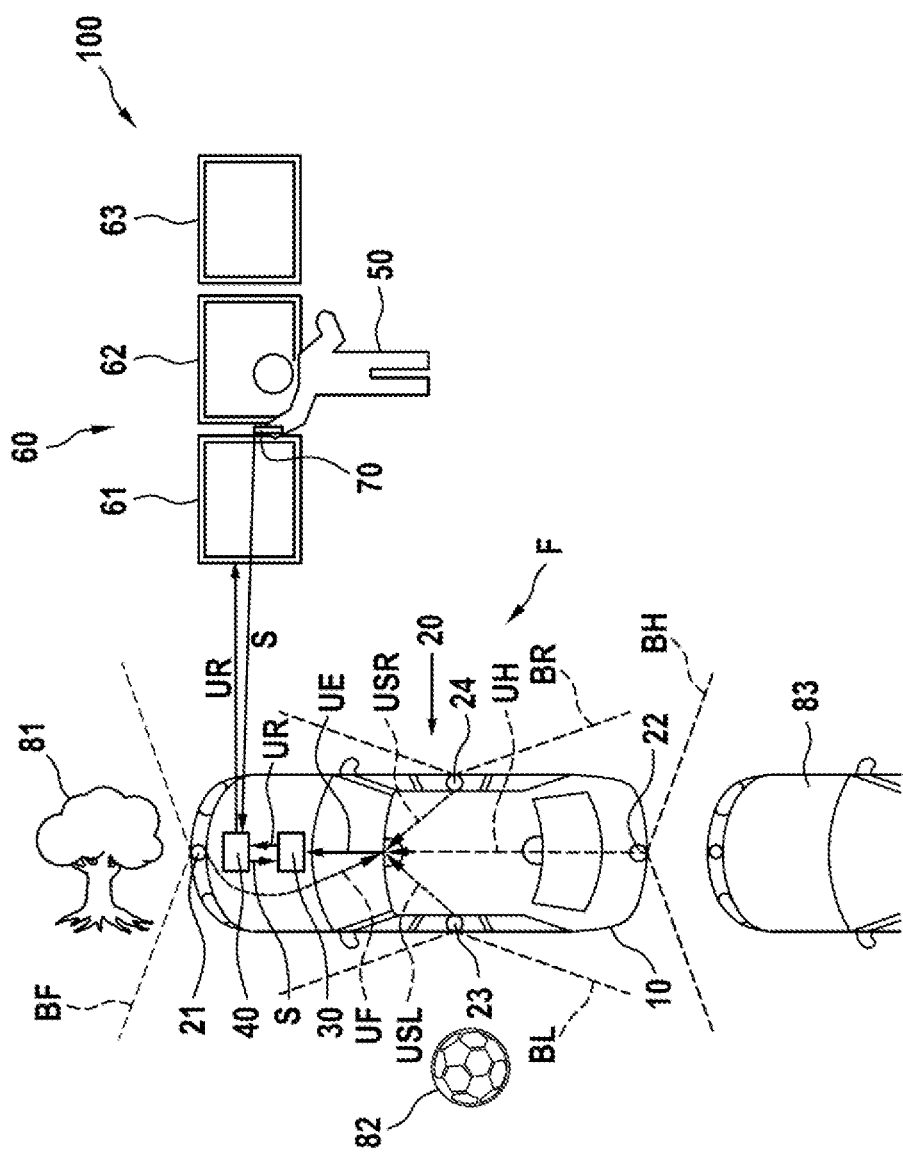
FIG. 1 shows a transmission system for the situational transmission of surroundings information of a vehicle.

FIG. 1 shows a transmission system 100, comprising an at least partly self-driven vehicle 10, having a recording device 20, a controller 30 and a transmission device 40. The transmission system 100 furthermore comprises an external data processing device 60 that is operated by a remote operator 50.

The recording device 20 comprises a front camera 21 that records front surroundings data UF, a rear camera 22 that records rear surroundings data UH, a left-hand side camera 23 that records left-hand surroundings data USL and a right-hand side camera 24 that records right-hand surroundings data USR. The front surroundings data UF, the rear surroundings data UH, the left-hand surroundings data USL and the right-hand surroundings data USR together give the recorded surroundings data UE that are provided to the controller 30.

The controller 30 determines a first driving situation F1 of the vehicle 10. For this purpose, the controller 30 determines an upcoming traffic situation. The route of the vehicle 10 is determined by routing. An association of the route with a digital map is preferably implemented based on topology and geometrical plane by way of map-matching. A classification of the roads contained in said map or interpretation algorithms may be used to divide the route into driving maneuvers, such as follow the road ahead, change lane, turn off, avoid an obstacle or the like. In the present case, the controller 30 determines the upcoming traffic situation as avoid an obstacle, as an obstacle in the form of a tree 81 is blocking the path of the vehicle 10.

The current position of the vehicle 10, in particular for example a relative distance until entry into a road segment with a changing traffic position, is then preferably determined. By way of example, the planned driving maneuver changes from follow the road to avoid an obstacle based on the current position of the vehicle 10.

The viewing angle, to be transmitted, of the surroundings sensors of the vehicle is preferably determined, in particular by the controller 30, based on the driving situation F.

The first front camera 21 has a front viewing angle BF, the rear camera 22 has a rear viewing angle BH, the left-hand side camera 23 has a left-hand viewing angle BL and the right-hand side camera 24 has a right-hand viewing angle BR.

The controller 30 then determines relevant surroundings data UR from the recorded surroundings data UE based on the first driving situation F1. Since an obstacle has been established only on the front side of the vehicle 10, the controller 30 determines the front surroundings data UF as relevant surroundings data UR.

The relevant surroundings data UR are transmitted to the external data processing device 60 by the transmission device 40. The external data processing device 60 comprises a first display device 61, a second display device 62 and a third display device 63 by way of which the remote operator 50 is able to estimate the driving situation F itself. The remote operator 50 is able to guide a driving maneuver of the vehicle 10 into the paths based on the estimation of said remote operator.

In the described first driving situation F1, the controller 30, as described, determines the relevant surroundings data UR consisting of the front surroundings data UF. These data are displayed to the remote operator 50, as is able to be seen in FIG. 2, on the second monitor 62. The remote operator 50, based on the displayed relevant surroundings data UR, detects that the tree 81 is blocking the path of the vehicle 10 and that the vehicle 10 possibly has to avoid the tree 81. The first display device 61 and the third display device 63 are not supplied with surroundings data.

While the remote operator 50 is attempting to estimate the first driving situation F1, the traffic situation changes and the second driving situation F2 arises. A football 82 approaches from the left-hand side of the vehicle 10. This is recorded by the left-hand side camera 23 as soon as it appears in the left-hand viewing field BL. The controller 30 then adjusts the relevant surroundings data UR such that they consist of the front surroundings data UF and the left-hand surroundings data USL. Both of these surroundings data are therefore also provided to the external data processing device 60 and transmitted thereto. As is able to be seen in FIG. 3, the left-hand surroundings data USL are then displayed on the first display device 61. The third display device 63 is not supplied with surroundings data.

The remote operator 50 then evaluates the newly displayed left-hand surroundings data USL on the first display device 61 and comes to the conclusion that these surroundings data are non-critical and therefore irrelevant. Using an operating device 70, the remote operator 50 transmits a control signal S to the vehicle 10, in particular to the transmission device 40, which forwards the control signal S to the controller 30. The controller 30 then adjusts the relevant surroundings data UR such that the left-hand surroundings data USL are no longer part of the relevant surroundings data UR.

As an alternative to driving around the tree 81, the remote operator 50 considers that it makes sense to reverse the vehicle 10 out of the hazardous area. For this purpose, the remote operator 50 requires the rear surroundings data UH of the vehicle 10. Using the operating device 70, the remote operator 50 transmits the control signal S to the vehicle 10. A third driving situation F3 arises. The controller 30 adjusts the relevant surroundings data UR such that they contain the rear surroundings data UH. As a result, as is able to be seen in FIG. 4, in the manner described above, the rear information data UH are displayed on the third display device 63. The remote operator 50 is able to see the further traffic participants 83 preventing the vehicle 10 from reversing via the third display device 63. The first display device 61 is no longer supplied with surroundings data.

Based on the third driving situation F3 that arises, the remote operator 50 will instruct the vehicle to implement an avoidance driving maneuver.

Figure 2:
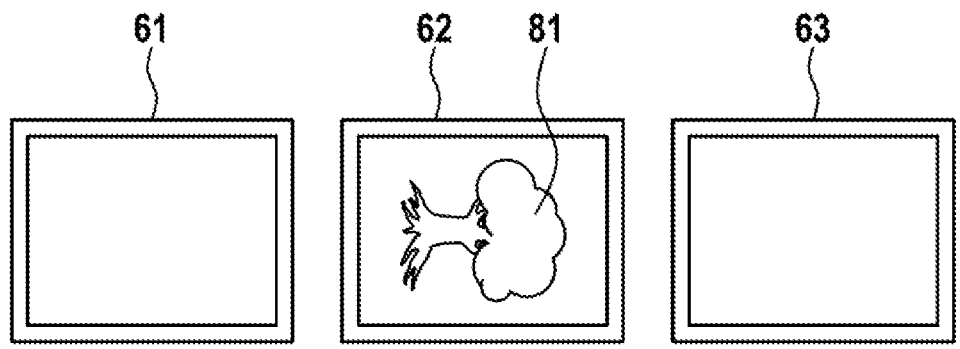
FIG. 2 shows an illustration of a remote operator in a first driving situation.
Figure 3:
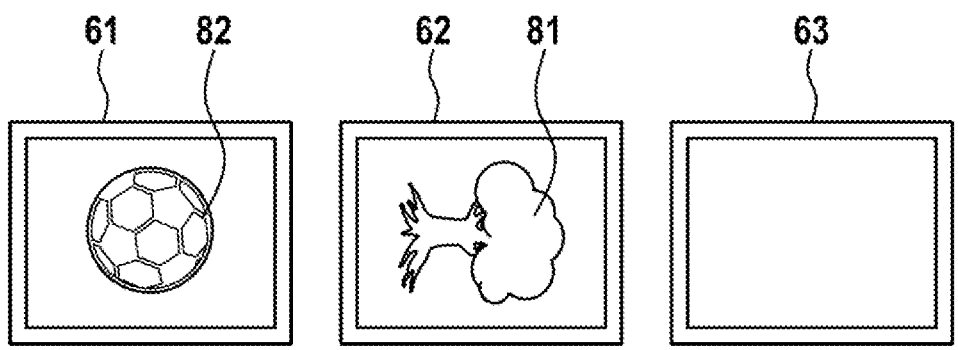
FIG. 3 shows an illustration of a remote operator in a second driving situation.
Figure 4:
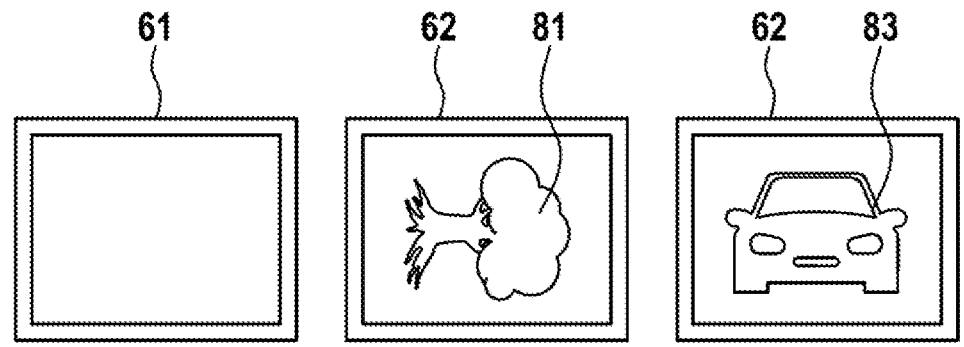
FIG. 4 shows an illustration of a remote operator in a third driving situation.
Figure 5:
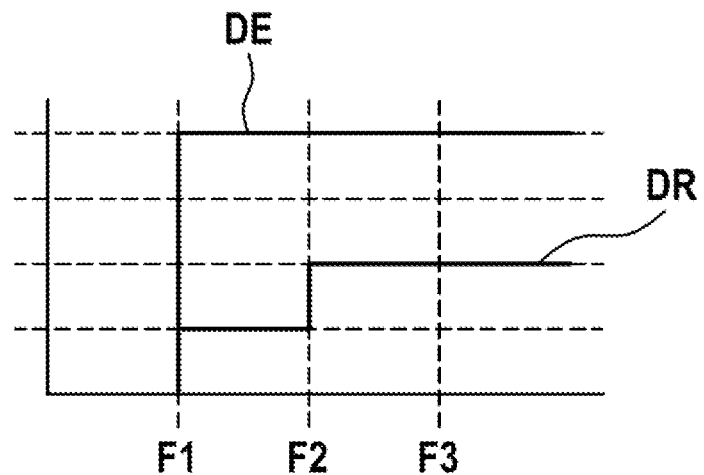
FIG. 5 shows a diagram of the required data rates in the individual driving situations.

FIG. 5 shows a diagram of the required data rates, comprising a relevant data rate DR for transmitting the relevant surroundings data and a recorded data rate DE for transmitting the recorded surroundings data, with regard to the driving situations F1 to F3 illustrated in FIG. 2 to FIG. 4. As is able to be seen, a lower data rate is required in order to transmit the relevant surroundings data in each of the exemplary driving situations F than to transmit all of the recorded surroundings data.

Figure 6:
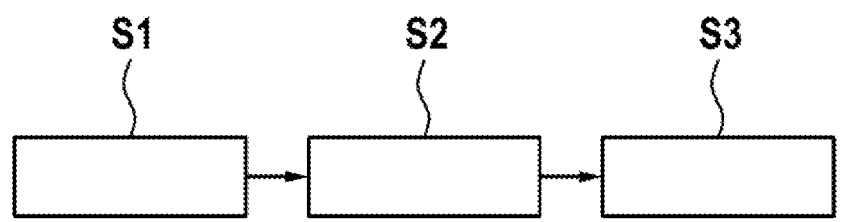
FIG. 6 shows a diagram of a method for the situational transmission of surroundings data of a vehicle.

FIG. 6 shows a diagram of a method for the situational transmission of surroundings data of a vehicle 10.

A driving situation F of the vehicle 10 is determined in step S1.

Relevant surroundings data UR are determined from recorded surroundings data UE based on the driving situation F in step S2, wherein the relevant surroundings data UR are a subset of the recorded surroundings data UE.

The relevant surroundings data UR are provided to an external data processing device 60 in step S3.

What is claimed is:
1. A method for situational transmission of surroundings data of a vehicle, the method comprising:
  determining a driving situation of the vehicle;
  determining relevant surroundings data from recorded surroundings data based on the driving situation, the recorded surroundings data being recorded by at least one sensor of the vehicle, the relevant surroundings data being a subset of the recorded surroundings data that are relevant to the driving situation;
  providing the relevant surroundings data to an external data processing device;

determining a change in the driving situation after providing the relevant surroundings data to the external data processing device;

adjusting the relevant surroundings data based on the change in the driving situation to include first additional surroundings data of the recorded surroundings data;

providing the adjusted relevant surroundings data that includes the first additional surroundings data to the external data processing device;

receiving a control signal from the external data processing device after providing the adjusted relevant surroundings data;

further adjusting the relevant surroundings data based on the control signal to exclude the first additional surroundings data; and providing the further adjusted relevant surroundings data that excludes the first additional surroundings data to the external data processing device.

2. The method according to claim 1, the further adjusting the relevant surroundings data further comprising:

further adjusting the relevant surroundings data based on the control signal to exclude the first additional surroundings data and to include second additional surroundings data of the recorded surroundings data.

3. The method according to claim 1 further comprising: transmitting the relevant surroundings data to the external data processing device.

4. The method according to claim 1, wherein the vehicle is configured as an at least partly self-driven vehicle.

5. The method according to claim 1, wherein at least one of the relevant surroundings data and the recorded surroundings data include at least one of (i) image data, (ii) video data, (iii) radar data, and (iv) lidar data.

6. The method according to claim 1, wherein a computer executes a computer program to determine the driving situation of the vehicle, determine the relevant surroundings data, and provide the relevant surroundings data to the external data processing device.

7. The method according to claim 6, wherein the computer program is stored on a computer-readable storage medium.

8. A controller for situational transmission of surroundings data of a vehicle, the controller configured to:

determine a driving situation of the vehicle;

determine relevant surroundings data from recorded surroundings data based on the driving situation, the recorded surroundings data being recorded by at least one sensor of the vehicle, the relevant surroundings data being a subset of the recorded surroundings data that are relevant to the driving situation;

provide the relevant surroundings data to an external data processing device;

determine a change in the driving situation after providing the relevant surroundings data to the external data processing device;

adjust the relevant surroundings data based on the change in the driving situation to include first additional surroundings data of the recorded surroundings data;

provide the adjusted relevant surroundings data that includes the first additional surroundings data to the external data processing device;

receive a control signal from the external data processing device after providing the adjusted relevant surroundings data;

further adjust the relevant surroundings data based on the control signal to exclude the first additional surroundings data; and provide the further adjusted relevant surroundings data that excludes the first additional surroundings data to the external data processing device.

9. A transmission system for situational transmission of surroundings data of a vehicle, the transmission system comprising:

a recording device configured to record surroundings data;

an external data processing device;

a controller configured to (i) determine a driving situation of the vehicle and (ii) determine relevant surroundings data from the recorded surroundings data based on the driving situation, the recorded surroundings data being recorded by at least one sensor of the vehicle, the relevant surroundings data being a subset of the recorded surroundings data that are relevant to the driving situation; and a transmission device configured to transmit the relevant surroundings data to the external data processing device, wherein the controller is further configured to (iii) determine a change in the driving situation after transmitting the relevant surroundings data to the external data processing device, and (iv) adjust the relevant surroundings data based on the change in the driving situation to include first additional surroundings data of the recorded surroundings data, wherein the transmission device is further configured to transmit the adjusted relevant surroundings data that includes the first additional surroundings data to the external data processing device, wherein the controller is further configured to (v) receive a control signal from the external data processing device after transmitting the adjusted relevant surroundings data, and (vi) further adjust the relevant surroundings data based on the control signal to exclude the first additional surroundings data, and wherein the transmission device is further configured to transmit the further adjusted relevant surroundings data that excludes the first additional surroundings data to the external data processing device.

\* \* \* \* \*